No. 627,620.
G. A. MARSH.
PLOW.
(Application filed Jan. 20, 1899.)
Patented June 27, 1899.
(No Model.)
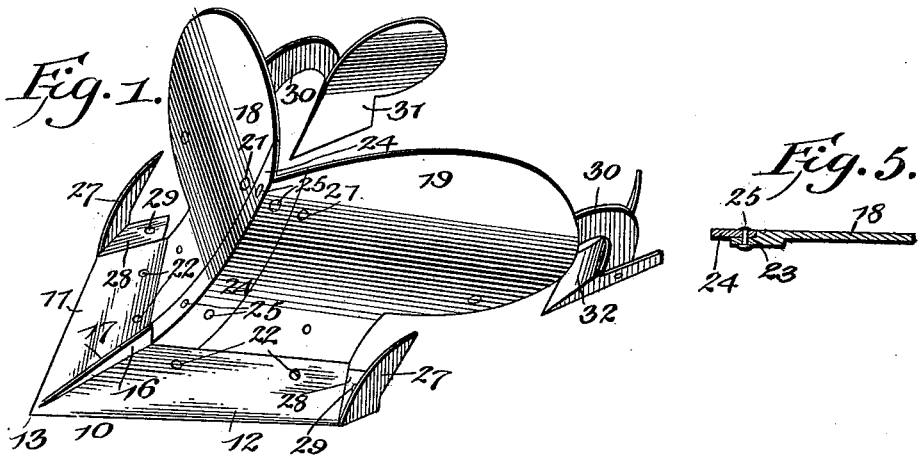
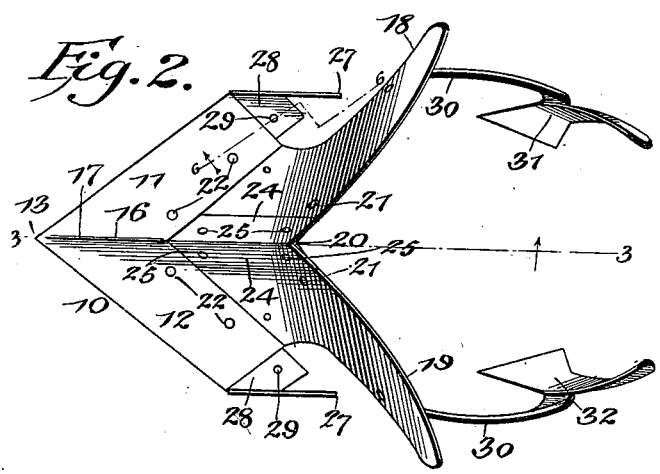
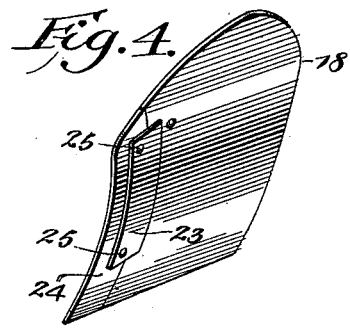
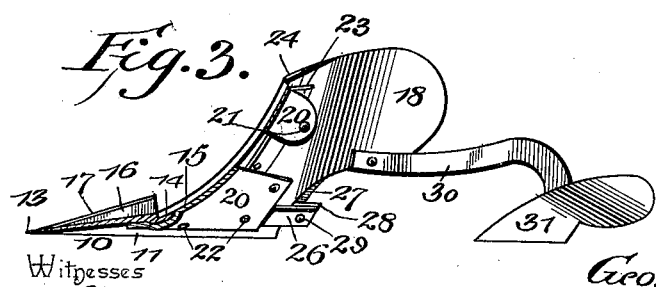
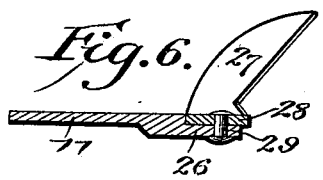
Witnesses
George A. Marsh, Inventor.
By his Attorneys,
C. A. Snow & Co.

UNITED STATES PATENT OFFICE.

GEORGE A. MARSH, OF ONG, NEBRASKA.

PLOW.

SPECIFICATION forming part of Letters Patent No. 627,620, dated June 27, 1899.

Application filed January 20, 1899. Serial No. 702,810. (No model.)

*To all whom it may concern:*

Be it known that I, GEORGE A. MARSH, a citizen of the United States, residing at Ong, in the county of Clay and State of Nebraska, have invented a new and useful Plow, of which the following is a specification.

My invention relates to improvements in plows, and one object in view is to provide means on the share which serve to divide or split the furrow in the center, so as to lighten the draft, minimize the wear on the share, and insure steadiness in the running of the plow.

A further object of the invention is to provide means by which the sides of the furrow may be cut in perpendicular lines, to the end that the furrow is not merely broken by the action of the share and moldboard, but the soil is cut on the land side for a distance equal to the depth of the furrow.

A further object of the invention is to provide means which will follow in the path of the share and serve to throw the dirt inwardly toward the center of the furrow for the purpose of forming a ridge adapted to cover seed or grain which may be deposited in the ground, whereby the ridge prevents the seed or grain from washing out during heavy rains. The plants are left in the middle of the ridge and the dirt is not blown by heavy winds over the plants.

A further object of the invention is to provide means for renewing the front edge of the moldboard, which is most exposed to wear, and this renewal of the moldboard shin-plate is effected in an easy and economical manner without drawing the temper of the moldboard by a welding operation and involving delay.

With these ends in view the invention consists in the novel construction and arrangement of parts, which will be hereinafter fully described and claimed.

To enable others to understand the invention, I have illustrated the preferred embodiment thereof in the accompanying drawings, forming a part of this specification, and in which—

Figure 1 is a perspective view of a moldboard and share for a plow constructed in accordance with my invention. Fig. 2 is a top plan view thereof. Fig. 3 is a vertical longitudinal sectional view on the plane indicated by the dotted line 3 3 of Fig. 2. Fig. 4 is a detail perspective view of one member of the moldboard looking at the rear side thereof and illustrating the renewable shin-plate. Fig. 5 is a transverse detail section through the moldboard and its shin-plate. Fig. 6 is a detail section through one member of the share and the side cutter thereon, the plane of section being indicated by the dotted line 6 6 of Fig. 2.

Like numerals of reference denote like and corresponding parts in each of the several figures of the drawings.

In carrying my invention into practice I employ a double share, which is indicated in its entirety by the numeral 10, and the members 11 12 of this share are inclined reversely to each other and arranged to slope upwardly and rearwardly from the front cutting edge of the share. The members meet each other at an angle to form the entrance or penetrating point 13, and at the rear edge of the share is provided a ledge-plate 14, which lies below and extends in rear of said edge of the share in order to produce the continuous seat 15.

One of the leading features of my invention consists in a central raised cutter 16, which is situated in the median line of the share. This cutter slopes upwardly and rearwardly from the point 13, and its upper edge is beveled or chamfered to produce the cutting edge 17. The central cutter may be formed as an integral part of the share by casting it in a single piece therewith; but I prefer to make this cutter in a separate piece from the share and to secure it removably in place thereon, so that the cutter when worn may be detached from the share and its place supplied by another cutter. The employment of this cutter in the median line of the share serves to divide or split the share in the center, and the cutter thus serves to lighten the draft on the implement, minimize the wear on the share, and insure steadiness in the running of the plow.

The members 18 19 of the moldboard are fashioned to resemble devices ordinary in the art, and said members are fitted to the seat 15 so as to have their front working faces flush with the exposed face of the share. The moldboard members are united at their contiguous edges by angular braces 20, (shown more clearly by Fig. 3,) and these braces are fastened to the members 18 19 by bolts 21, the lower brace being also united to the share 10. As is usual in the art, the members of the moldboard are fastened to the share by bolts, as at 22.

It is well known to those skilled in the art that the front edge of the moldboard wears away owing to the friction of the soil thereon when the implement is in service, and it is customary for the user to weld a strip or plate of metal to this edge of the moldboard in order that its life may be prolonged. This is objectionable not only because of the time, delay, and expense involved, but the operation of welding this strip on the moldboard draws the temper thereof, and hence the moldboard wears more rapidly than the piece which is welded thereto. I overcome these objections by constructing the moldboard in a manner to accommodate a shin-plate, which may be readily removed when worn, and another plate easily and firmly secured to the moldboard to restore the front edge thereof in order to secure maximum efficiency. Each section of the moldboard is provided at its inner edge with a ledger-plate 23, which lies in rear of and projects beyond said edge of the moldboard in order to form a seat for the reception of the movable shin-plate 24. The shin-plate rests on the ledger-plate 23, so as to be flush with the working face of the moldboard, and it is fastened securely, but removably, in place on the ledger-plate 23 by any suitable means—as, for instance, by the bolts 25. It will be noted that the shin-plate constitutes the front edge of the moldboard-section, and these two plates on the two moldboard-sections are fashioned or curved to join each other for the purpose of producing the ridge or prow which lies in rear of the central cutter 16. Either shin-plate may be removed from its moldboard-section and another plate secured in proper position on the ledger-plate of the moldboard. It is of course understood that the moldboard-sections should be removed from the share previous to renewing the shin-plates thereof.

I have also constructed the share for the reception of side cutters which serve to sever the furrow from the land side in a plane perpendicular to the furrow, and to this end the share is constructed with short ledger-plates 26 at the ends thereof. These ledger-plates lie transversely across the share and below the working face thereof for the formation of seats. The side cutters 27 occupy vertical positions at the ends of the share and the working edges of said cutters incline upwardly and rearwardly from the plane of the working face of the share. Each cutter is disposed obliquely to the face of the share, and said cutter is formed with a shank 28, which extends at an angle from the cutter and is fitted in the seat formed by the ledger-plate 26, said shank being fastened in place by one or more bolts 29.

In my improved plow I have also provided covering-plows which lie in rear of the moldboard-sections and are disposed in the vertical plane of the side cutters, so as to follow in the path thereof. These rear plows are arranged to throw the dirt of the furrow inwardly toward the median line of said furrow in order to produce therein a ridge which affords protection to the seed and growing plants. Arms 30 are secured firmly at their front ends to the moldboard-sections, at or near the outer edge thereof, and these arms are curved to extend inwardly toward each other and rearwardly from the moldboard. The small rear plows 31 32 are fastened securely by bolts or other suitable means to the rear free ends of the curved arms, and these rear plows are inclined reversely to each other and are separated a proper distance in order that they may throw the dirt inwardly toward the central line of the furrow, and thus produce therein a ridge. When the improved attachment is used on a planter, the rear plows 31 32 serve to cover up the seed or grain which may be deposited in the ground, and this ridge protects the seed from washing out during heavy rains. The plants grow in the middle of the ridge and the dirt of the ridge is not likely to be blown by heavy winds over the plants.

Changes may be made in the form and proportion of some of the parts while their essential features are retained and the spirit of the invention embodied. Hence I do not desire to be limited to the precise form of all the parts as shown, reserving the right to vary therefrom.

Having thus described the invention, what I claim is—

1. In a plow, the combination of a double share, moldboards united individually to the respective members of said share, and shin-plates secured to the inner contiguous faces of the moldboards and removable therefrom independently of each other, substantially as described.

2. In a plow, the combination of a double share, moldboards secured individually to the respective members of said share and provided with recesses or seats at their contiguous edges, and shin-plates fitted in said recesses or seats of the moldboards to meet one another and lie flush with the surfaces of the moldboards, each shin-plate being secured removably to one moldboard, substantially as described.

3. In a plow, the combination of a double share, moldboards having the ledger-plates forming the recesses and secured to the respective members of the share, the shin-plates fitted in said recesses to lie flush with the moldboards and meeting each other beyond the inner edges of the moldboards, and braces united to the rear sides of the moldboards irrespective of the shin-plates, substantially as described.

4. In a plow, a moldboard having a ledger-plate on its rear face and forming with the front edge thereof a seat which lies below the working face of the moldboard, and a shin-plate secured removably to the ledger-plate, in the seat formed thereby, and lying flush with the working face of the moldboard, substantially as described.

5. In a plow, the combination of a double share having the central cutter, the moldboards and the shin-plates secured to the inner edges of said moldboards and meeting each other in the plane of the central cutter on said share, substantially as described.

6. In a plow, a double share provided at its ends with the transverse ledger-plates and at its middle with the central cutter, and the vertical cutters each having the offstanding shank secured removably to one ledger-plate to lie flush with the share, said side cutters arranged in planes parallel to the central cutter on said share, substantially as described.

7. In a plow, the combination of a double share provided at its ends with the offstanding ledger-plates, and the side cutters each having a shank secured removably to the ledger-plate and arranged flush with the share, each side cutter being disposed in a vertical position at one end of the share and provided with a working edge which inclines upwardly and rearwardly from the face of the share, substantially as described.

8. In a plow, a double moldboard provided with the rearwardly-extending arms, and oppositely-inclined plows supported by said arms and disposed on opposite sides of the median line of the moldboard, substantially as described.

9. The combination with a double moldboard, of arms fastened thereto and extending rearwardly therefrom, and plows attached to said arms to lie on opposite sides of the median line of the moldboard and inclined reversely toward each other, for the purpose described, substantially as set forth.

10. In a plow, the combination with a double share, and a double moldboard united therewith, of side cutters attached to the ends of the share in advance of the moldboard, arms secured to the moldboard and extending rearwardly therefrom, and oppositely-inclined plows supported by the arms in rear of the moldboard and lying in substantially the vertical plane of the side cutters, as and for the purposes described.

In testimony that I claim the foregoing as my own I have hereto affixed my signature in the presence of two witnesses.

GEORGE A. MARSH.

Witnesses:
L. E. DEWEY,
A. R. RUDD.